(12) United States Patent
Leppa et al.

(10) Patent No.: US 6,681,123 B2
(45) Date of Patent: *Jan. 20, 2004

(54) BASE STATION FOR EXTENDED SERVICES

(75) Inventors: Ari Leppa, Espoo (FI); Esko Rautanen, Espoo (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,583

(22) Filed: Jun. 3, 1999

(65) Prior Publication Data

US 2003/0036401 A1 Feb. 20, 2003

Related U.S. Application Data

(63) Continuation of application No. PCT/FI97/00747, filed on Dec. 2, 1997.

(30) Foreign Application Priority Data

Dec. 5, 1996 (FI) .................................................. 964877

(51) Int. Cl.[7] .............................. H04B 1/38; H04M 1/00
(52) U.S. Cl. ..................... 455/561; 455/426.1; 455/560
(58) Field of Search ............................... 455/517, 500, 455/507, 422.1, 424, 426.1, 550.1, 556.1, 557, 560, 561; 370/352

(56) References Cited

U.S. PATENT DOCUMENTS 5,081,641 A    1/1992  Kotzin et al.
5,592,480 A  * 1/1997  Carney et al. ............... 370/347
5,598,412 A  * 1/1997  Griffith et al. .............. 455/560
5,742,905 A  * 4/1998  Pepe et al. ................... 455/461
5,898,931 A  * 4/1999  L'Anson et al. ............. 455/560
6,128,486 A  * 10/2000 Keskitalo et al. ........... 455/422

FOREIGN PATENT DOCUMENTS

DE    4406505    8/1995
EP    0647077    4/1995
EP    0766427    4/1997

* cited by examiner

*Primary Examiner*—Quochien Vuong
*Assistant Examiner*—Simon D Nguyen
(74) *Attorney, Agent, or Firm*—Squire, Sanders & Dempsey, L.L.P.

(57) ABSTRACT

The invention is related to a base station for a cellular network, the base station being connected via the radio path to the mobile stations (MS) in the area of a cell formed by the base station and via a transmission network to the means controlling the base station (MSC). The base station comprises (a) a first group of units forming a physical interface for the transmission network and a radio interface for the mobile stations (MS), and (b) an internal bus system, which comprises several buses into which the units are connected and by means of which the units are connected to each other. In order to efficiently provide other telecommunications services, the base station has a second group of units, which forms at least one interface for other external devices, and the base station is equipped with an internal cross-connection for switching traffic at least between the external devices and the transmission network.

19 Claims, 7 Drawing Sheets

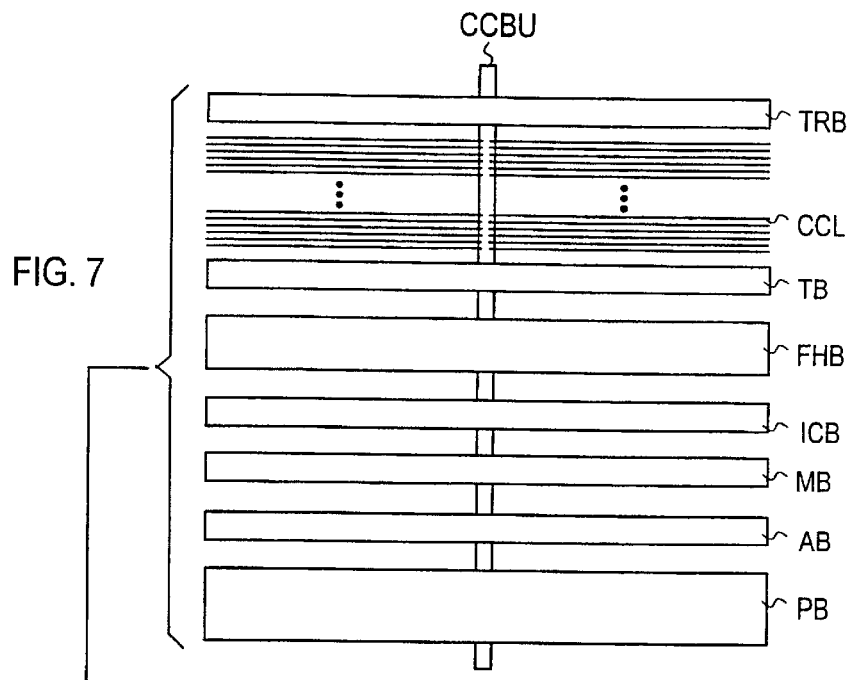
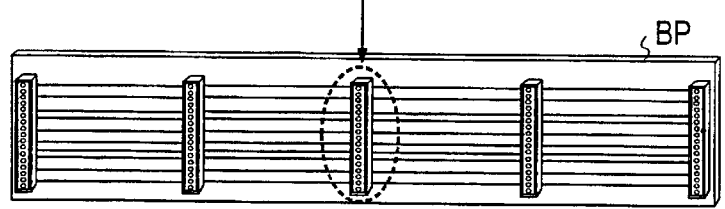
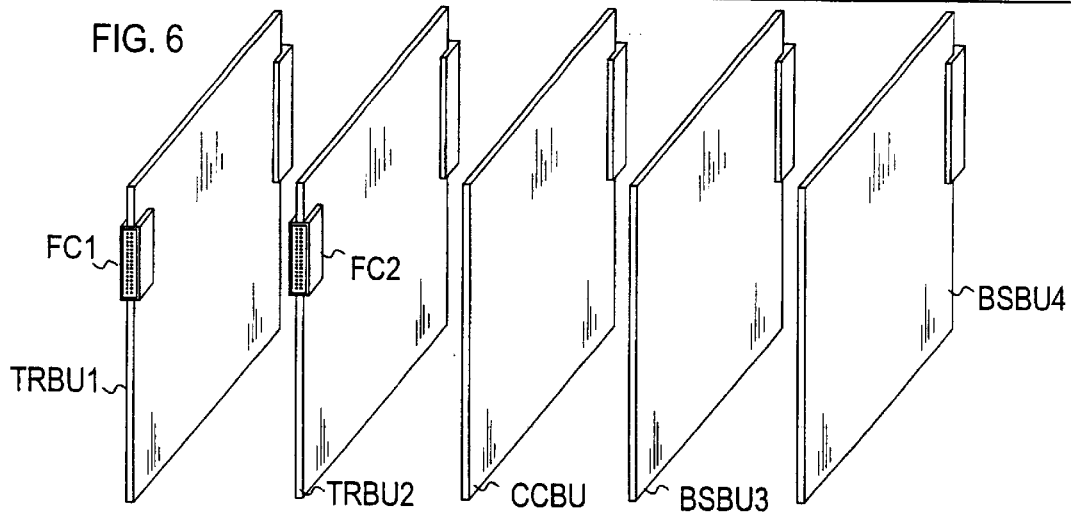
FIG. 7
FIG. 6

BASE STATION FOR EXTENDED SERVICES

This application is a continuation of PCT/FI97/00747 filed Dec. 2, 1997.

FIELD OF THE INVENTION

The invention is related in general to the infrastructure of telecommunications networks and in particular to the integration of a cellular network base station and other telecommunications services.

BACKGROUND OF THE INVENTION

The traditional infrastructure of a telecommunications network is such that the cellular network and its transmission network offer mobile communications services and, in addition to that, another transmission network and its terminals offer other telecommunications services. FIG. 1 illustrates the situation described above by showing a building with base stations (BS) on different floors F1 . . . F4 as the end-user's environment, the base stations forming micro cells which serve the mobile subscribers moving within these cells. The base stations are typically connected in a star shape to a cross-connection device (XCD) located in the equipment space of the building and the cross-connection device connects the base stations further towards the trunk network. In addition to this, the same building can contain, for example, a LAN which typically includes a concentrator (C1) which is located in the equipment space and into which the LAN servers (SE1 and SE2) are typically connected. From the concentrator, base cable segments (BSG) are drawn to the floor-specific distributing frames, which comprise typically a lower level concentrator (C2) from which is drawn star-shaped cabling, that is, one cable for each device, such as a terminal (TE1), a printer (TE2), etc.

If one wants to use the same transmission network for offering telecommunications services other than the services of a cellular network, the said other telecommunications services are offered by using separate equipment, in which case the said equipment and possible weather-proof covering must be installed in the customer's premises or the equipment space. This kind of solution is illustrated in FIG. 2, in which a separate cross-connection device (XCD) has been installed in the equipment space of the building, and through this device it is possible to connect, for example, LANs, fax machines or ISDN telephones in the same transmission network with the base stations. The cross-connection device separates the signals going to the base stations into the base station lines (BL) and the base station converts a signal to a suitable form for the radio path. A separate cross-connection device can also be located in connection with an individual base station. For example, the applicant has a product for the above-mentioned purpose which is marketed by the name DN2 (Digital Node 2). This device offers 2 Mbit/s connections and comprises cross-connection board units which each have a connection capacity of 2×2 Mbit/s.

When using solutions such as the ones described above, a separate infrastructure must be built in addition to the cellular network or, at least, separate node equipment must be installed for implementing other telecommunications services, which is an expensive solution. It is also possible that limited space prevents the installation of separate equipment in connection with the base stations, because the base stations must be located in places where there is no room for (large) separate equipment. This problem will be aggravated in the future, because the size of cells and base stations decreases and the base stations will more often be located somewhere else than on the roofs of buildings, for example, in the customer premises. In this kind of situation, the services must have been implemented previously by using two separate transmission networks (see FIG. 1).

The known solutions also require long installation times, because in practice their installation requires several different installation teams. This also increases the total costs.

The difficulties in integration of services has also caused problems for the network management, especially when the same operator has wanted to offer as large a selection of services as possible.

SUMMARY OF THE INVENTION

The objective of the invention is to eliminate the above-mentioned disadvantages and to create a solution which makes it possible to integrate the base stations of a cellular network and other telecommunications services cost-effectively.

This objective can be accomplished by using the solution defined in the independent patent claim.

The idea of the invention is to integrate a base station of a cellular network with equipment offering other telecommunications services, so that they form a functional whole, by equipping the base station internally with units, which offer interfaces to different services, and with cross-connection functions between different units. These cross-connection functions can be implemented either by distributing them to all units or by centralizing them into a separate cross-connection unit in the base station.

Due to the solution in accordance with the invention, services can be implemented by using compact equipment which is easy and quick to install. Because the equipment can be installed in a space smaller than before, installation is possible in locations where the large equipment groups required by the known solutions could not have been installed (for example, public places).

The investments required for the equipment are smaller, because the functionalities common to the separate devices can be combined.

Due to the solution in accordance with the invention, it is easier for the operators (for example, cellular network operators) to offer additional services to their customers. Because all of the network management tasks, for example, can after this be implemented from one network management device, the operation and usage costs of the equipment are lower than before.

BRIEF DESCRIPTION OF THE FIGURES

In the following, the invention and its preferred embodiments are described in closer detail in relation to FIGS. 3–8 in the examples in accordance with the enclosed drawings, in which FIG. 6 illustrates the architecture of a base station in accordance with the second embodiment of the invention, FIG. 7 illustrates the internal bus structure of a base station in accordance with FIG. 6.

DETAILED DESCRIPTION OF THE INVENTION

In a traditional solution, the base station typically comprises both transmission units and base station units. A transmission unit takes care of the traffic between the transmission network and the base station and it includes an external interface for the transmission network. The base station unit in turn comprises the radio parts of the base station, said parts being connected to the antenna. The connection between these units is fixed so that all traffic going through the radio interface of the base station also goes through the external interface formed by the transmission unit. (The radio interface is the (air) interface between the base station and the mobile stations.) Usually one standard 2 Mbit/s PCM interface is enough for the total capacity of the base station, in which case all traffic going through the radio interface also goes through the 2 Mbit/s interface in question.

In more recent solutions, base stations are concatenated in the transmission network so that each base station takes from the transmission network the traffic from the time slots allocated to its own units and connects the rest of the time slots to the next base station. Thus, in this case there is a fixed branching defined within a base station board unit (or between two board units) for branching the traffic to the next base station in the chain.

In a solution in accordance with the invention, the fixed branching within a base station is replaced by cross-connection functions corresponding to a separate cross-connection device and the base station is equipped internally with transmission units providing different service interfaces, whereby cross-connection is carried out between service interfaces and the transmission network or between two service interfaces. With the latter alternative, it is possible to use the base station for offering local telecommunications services, for example, connecting parts of a LAN, in addition to offering mobile communications services.

Figure 1:
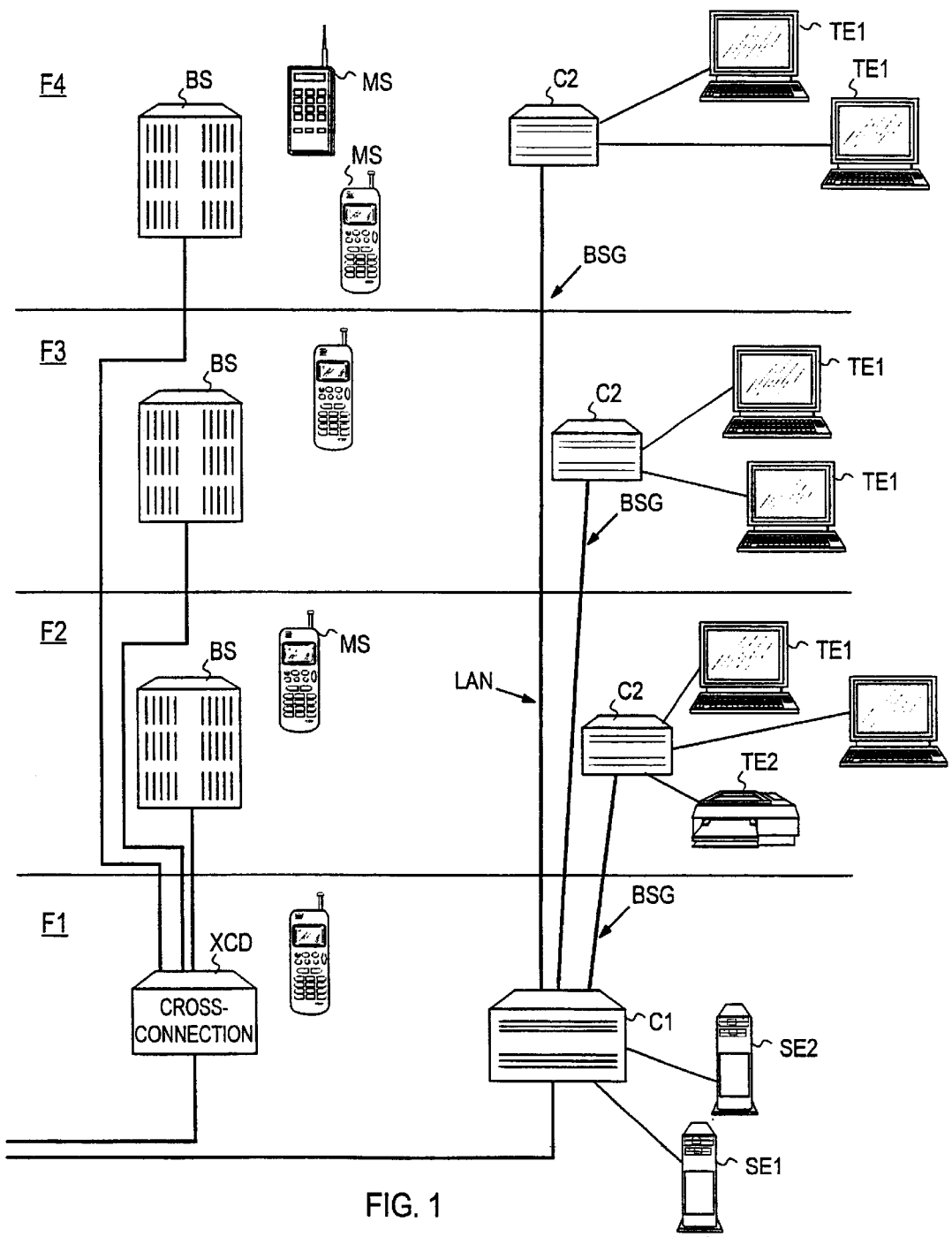
FIG. 1 illustrates a typical implementation of telecommunications services in the end-user environment.
Figure 2:
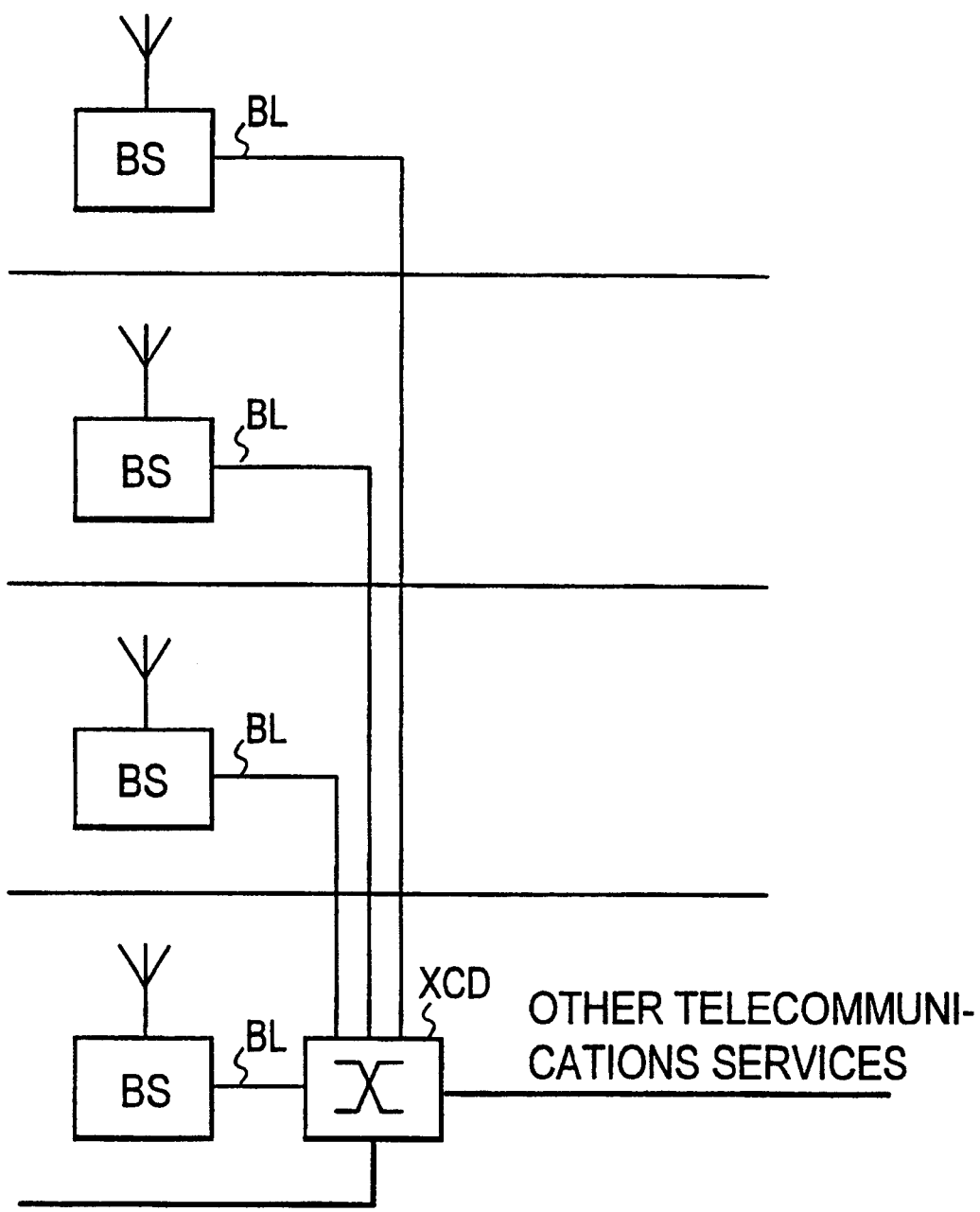
FIG. 2 illustrates another known method of implementing different telecommunications services.
Figure 3A:
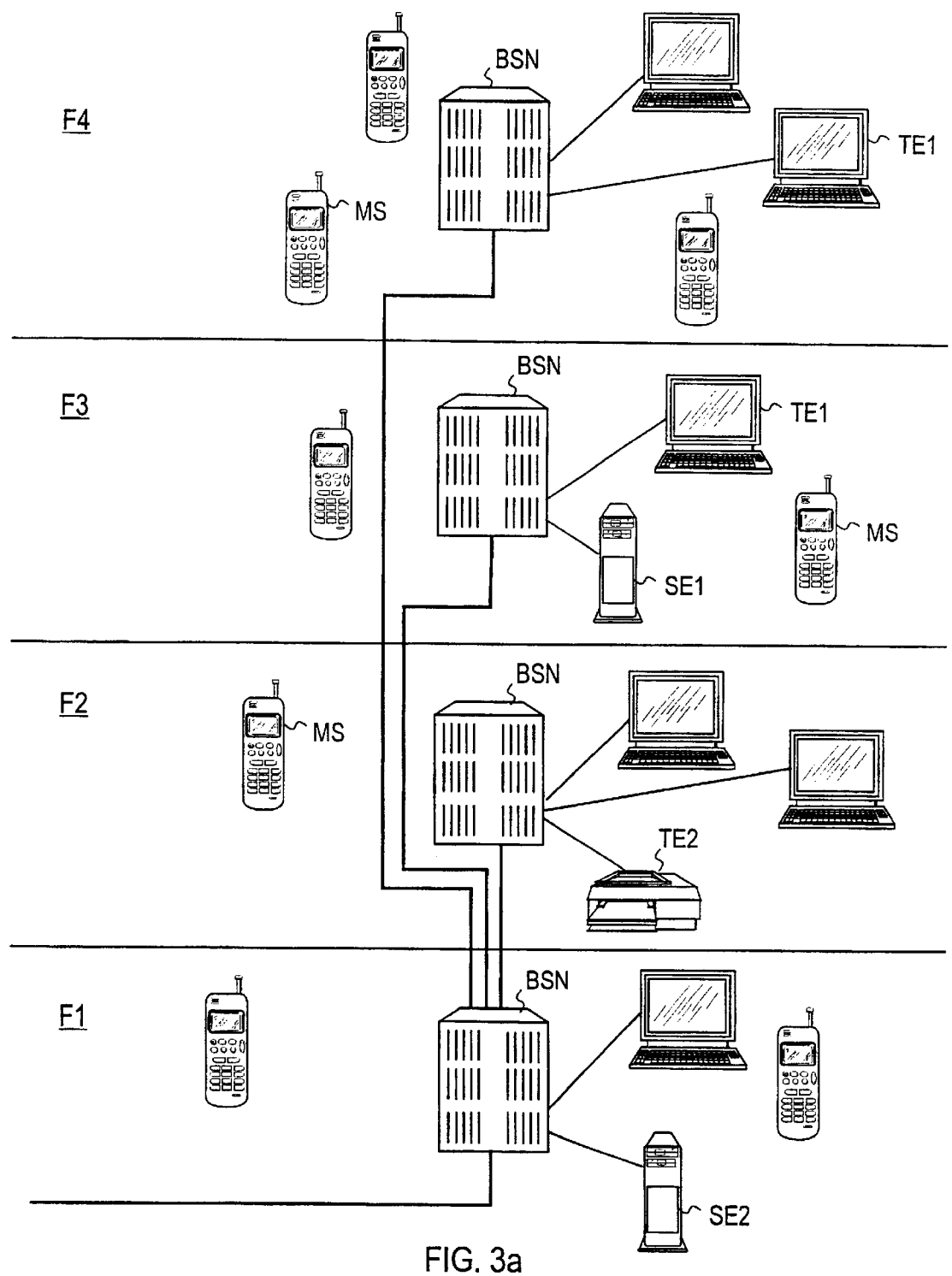
FIG. 3a illustrates one implementation of telecommunications services in accordance with the invention in the end-user environment.
Figure 3B:
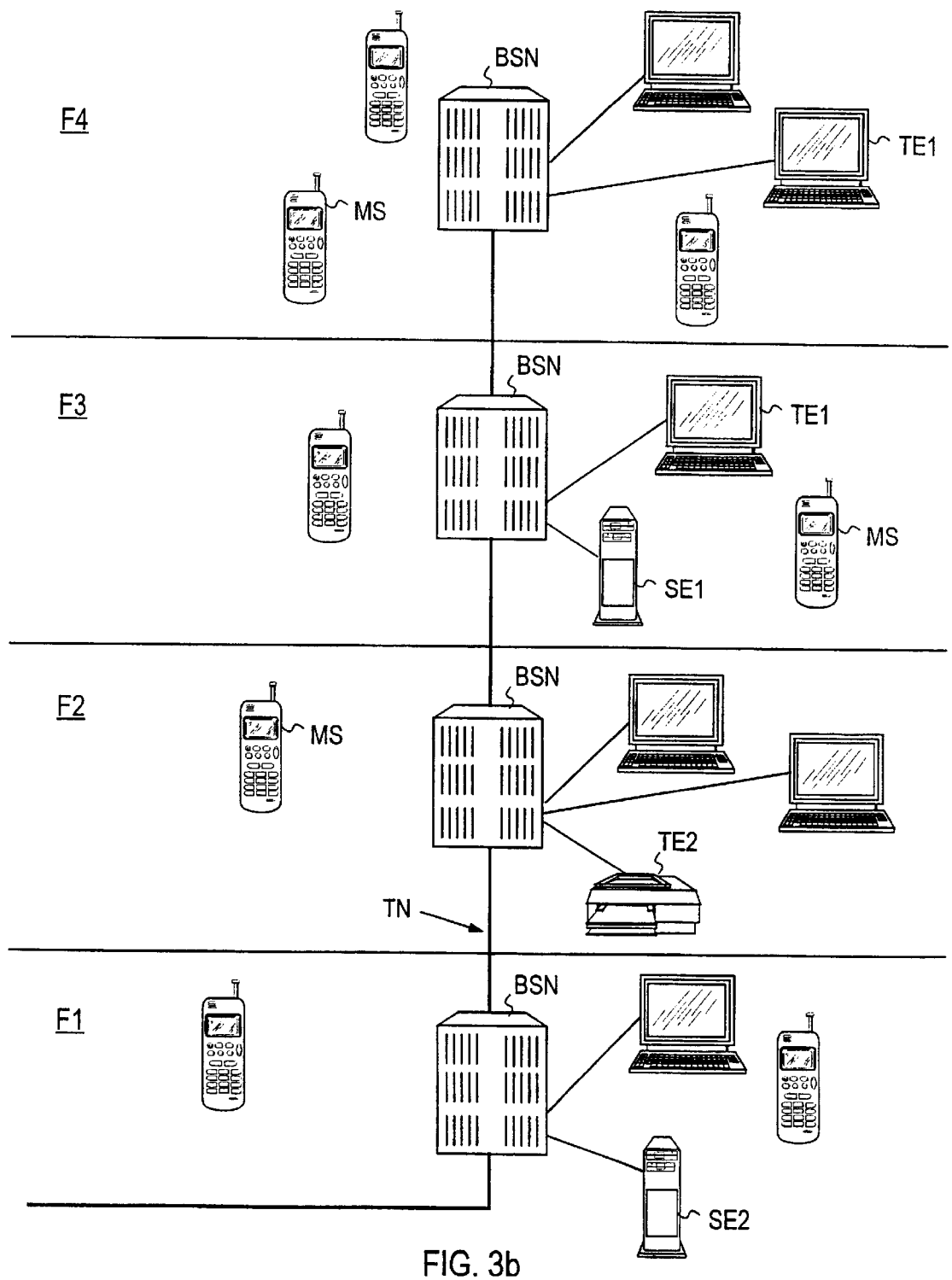
FIG. 3b illustrates an alternative topology for the network in FIG. 3a, FIG. 4 illustrates the architecture of a base station in accordance with the first embodiment of the invention.

FIGS. 3a and 3b illustrate the difference in the principle of the solution in accordance with the invention in comparison to the solutions illustrated in FIGS. 1 and 2. In accordance with the invention, a traditional base station of a cellular network and transmission node equipment are integrated so that they have a common bus structure and common mechanics. In this way a new type of base station node BSN is formed, which offers both mobile communications services and telecommunications services. The transmission units of the base station node are pushed directly into the base station node so that they are connected to its internal buses. The topology of the network may vary; for example, the base station nodes BSN can be connected in a star-shape into a common base station node (FIG. 3a) or they can be chained by using cabling TN connecting the base station nodes (FIG. 3b). The topology of the network can also be a combination of stars, chains or loops so that it comprises at least one of these basic topologies. If the reliability of the system is to be increased, the chained base stations can be protected with loops. The common base station node (FIG. 3a) is similar in structure to other base station nodes. In some cases the capacity of the common base station node may be inadequate for implementing the cross-connection in which case it can be replaced with a cross-connection node having greater capacity.

The cross-connection functions of a base station node can be implemented by two alternative methods: by distributed cross-connection or by centralized cross-connection.

Figure 5:
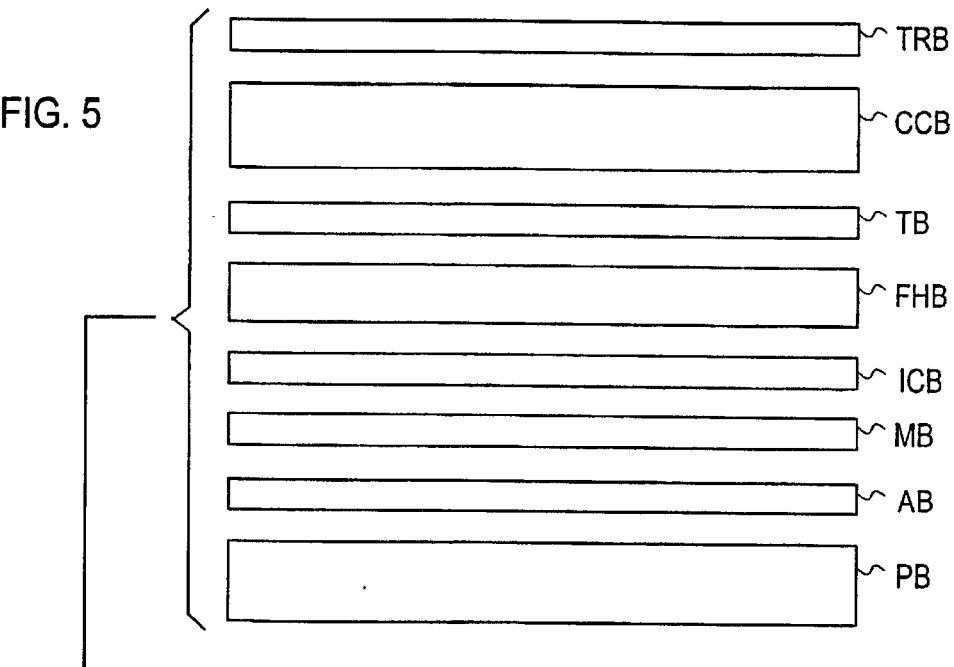
FIG. 5 illustrates the internal bus structure of a base station in accordance with FIG. 4.
Figure 4:
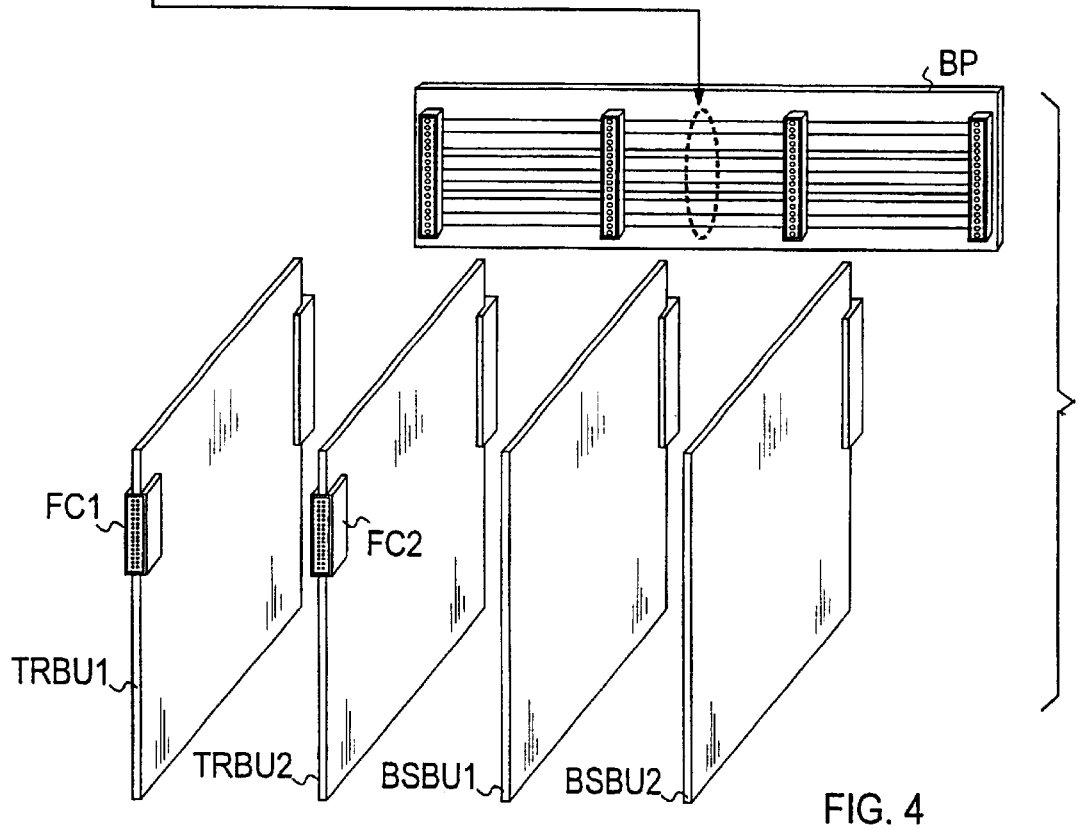

The distributed solution is illustrated in FIGS. 4 and 5. FIG. 4 illustrates the architecture of a base station node equipped with distributed cross-connection. The internal buses of the equipment are on the backplane or mother board (BP) of the base station node, and they are illustrated in FIG. 5 in which the width of the bus illustrates its relative capacity. Those board units on which base station units (radio parts of the base station) have been formed are connected to this internal bus system. In the Figure, there are two of these base station board units, marked as BSBU1 and BSBU2 (board units are also called plug-in units). Additionally, transmission board units which are equipped with different connection interfaces for offering telecommunications services from the base station node are connected to the bus. In the Figure there are also two of these transmission board units and they are marked as TRBU1 and TRBU2. At least one of the board units also offers an interface to the transmission network. The number of transmission board units may vary and they can be equipped with different types of interfaces. The transmission board units may offer, for example, HDSL, ISDN and V.35 interfaces or standard interfaces for LANs. In an example in accordance with the Figure, such interfaces are formed via the front connectors (FC1 and FC2) of the transmission board units.

In one preferred embodiment of the invention, at least one of the transmission board units is a radio link unit which forms a radio link interface in the base station. Via this kind of radio link it is possible to connect the base station, for example, to the neighboring base station or to the equipment controlling the base station.

In a distributed solution one of the buses in the backplane (BP) is a cross-connection bus (CCB) (FIG. 5) into which at least the transmission units of the base station are connected. The cross-connection bus is implemented in a known way, for example, by using time division so that a separate time slot is reserved for the traffic between certain board units in the bus frame. (There are also other known implementation methods, for example, an ATM-type switching field in which the packets are connected to the correct output using an internal routing identifier.) Each board unit has its own cross-connection circuit, which is used for making the cross-connection (that is, the cross-connection is distributed to board units).

In a centralized solution, which is illustrated in FIG. 6, there is a separate cross-connection unit, that is, a separate board unit (CCBU) for cross-connection, and the board units do not have cross-connection functions. Traffic in all other board units is, in this case, first connected to the cross-connection unit (CCBU) and therefore, separate cross-connection wires come from the board units (CCL) (FIG. 7) to the cross-connection unit (CCBU), which makes the cross-connection (using a known method).

The advantage of a distributed solution is that it is easy to expand the base station, because each board unit to be added to the base station brings the cross-connection capacity with it. In a centralized solution a large enough cross-connection unit must be selected to begin with, so that it has adequate capacity for connecting all of the traffic which may go through the base station in the future. Thus, a very small base station may, from the very beginning, require an expensive cross-connection board with large capacity, which could remain under-utilized, as regards capacity, for a very long time.

The buses shown in FIGS. 5 and 7 are described briefly in the following.

The traffic bus (TRB) of the base station is the bus through which the traffic going via the air interface of the base station is transferred. So the base station boards and the transmission board units relaying the traffic of the air interface are connected to this bus.

The cross-connection between different board units is carried out in the cross-connection bus (CCB). It is also possible that the traffic going through the air interface, or part of it, goes through the cross-connection bus. In this case the traffic bus (TRB) of the base station may be missing entirely or it may be used, for example, only for speech traffic. If the traffic going through the air interface is relayed via both the cross-connection bus and the traffic bus, there are two types of base station board units (those which are connected to the traffic bus and those which are connected to the cross-connection bus).

The timing bus (TB) offers timing for each board unit. Correct timing is required, for example, for carrying out the cross-connection at the right moment (distributed cross-connection).

The frequency hopping bus (FHB) is a bus used only by the base station board units and it is used for implementing frequency hopping.

The intercontroller bus (ICB) is a bus through which the controllers of the different board units communicate with each other. (In practice, almost every board unit has its own controller.)

The network management signals are transferred via the management and maintenance bus (MB). A terminal used by maintenance personnel can be connected to this bus, for example, if software on different board units is to be updated.

The alarm bus (AB) is used for transferring alarms.

The power supply bus (PB) is used for transferring power to the board units.

A centralized solution has a group of cross-connection lines (CCL) instead of a separate cross-connection bus. Each one of these lines forms a point-to-point connection between a cross-connection board unit (CCBU) and some other board unit.

The example described above concerns a situation in which a unit internal to the equipment also forms the board unit. This is not necessary, however as one unit may be, for example, distributed to several board units.

As the implementation of cross-connection involves normal and well-known techniques, it is not described in more detail here. To mention a practical example, it can be stated that a cross-connection may be implemented, for example, by using the principle used in the Siemens PEB 2045 circuit.

Figure 8:
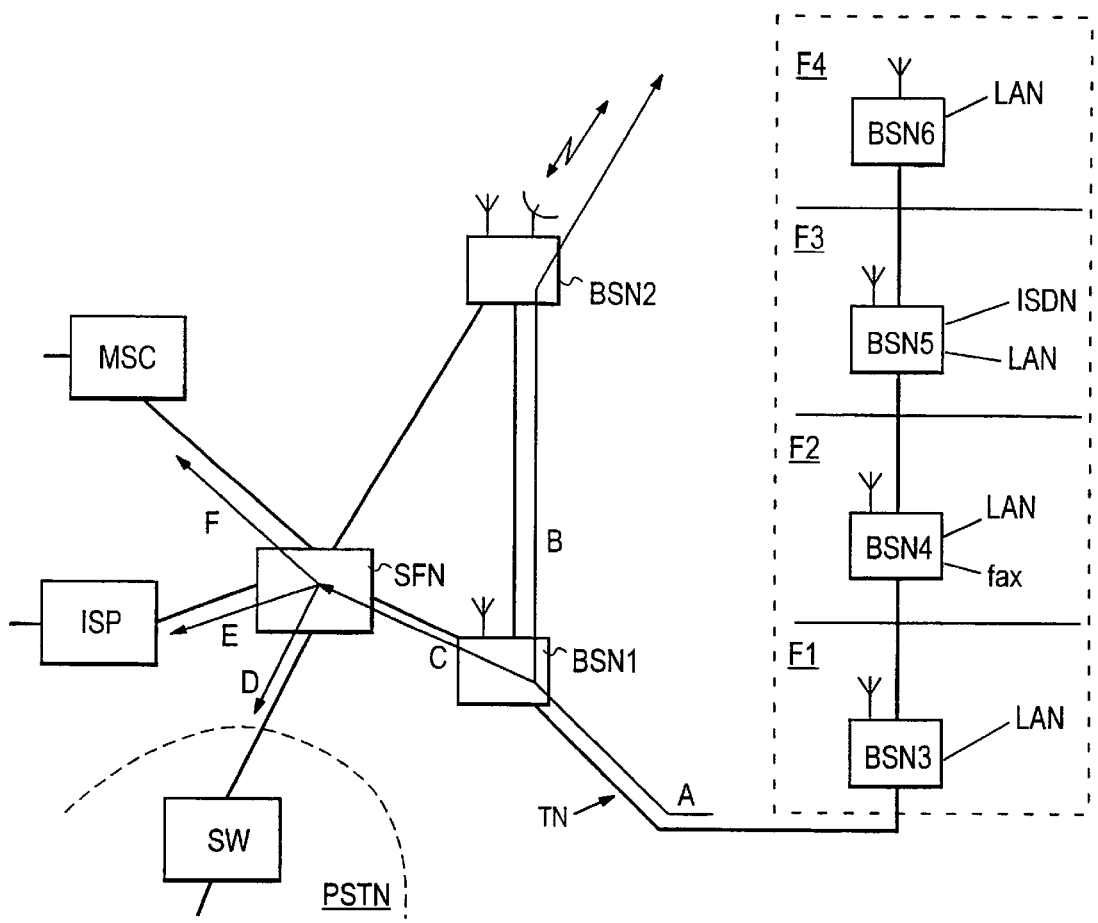
FIG. 8 illustrates the implementation of telecommunications services in accordance with the invention at the network level.

FIG. 8 illustrates a solution in accordance with the invention at the network level. Locally generated traffic (base station nodes BSN3 . . . BSN6) are connected via the nodes towards the trunk. network. In a traditional mobile communications network the traffic goes through a mobile services center (MSC), which is equipped with different system interfaces in order to connect the mobile communications network to other networks, such as a public switched network, ISDN network, other mobile communications networks or packet-switched data networks. Thus, a traditional mobile communications network has a hierarchy resembling a tree, in which the mobile services center is the root of the tree and the base stations and subscribers are branches and leaves, respectively. Traditionally, the traffic goes all the way from the root to the leaves in this "tree".

As traffic related to different services goes through the same trunk network when using a base station node in accordance with the invention, cross-connection points are required in the network for separating traffic related to different services from each other in these points. In this way the traffic no longer goes "vertically through the entire tree", as there are cross-connection points in the network distributing the traffic coming from the terminals "in the horizontal direction" even before reaching the root of the tree. Because the base station of a cellular network is equipped with cross-connection features, the base station nodes can form this kind of cross-connection nodes. The Figure illustrates two base station nodes, BSN1 and BSN2, which function both as base stations and as cross-connection points of a transmission network, in which the traffic coming from the users (arrow A) is distributed in different directions (arrows B and C). Additionally, the network typically has service front nodes (SFN) which distribute traffic related to different services to the corresponding nodes, for example, the cellular network traffic to the mobile services center (MSC) (arrow F), Internet traffic to the node of the operator offering Internet services (ISP) (arrow E) and ISDN calls to the public telephone network node (SW) (arrow D). Thus, if the base stations BSN3 . . . BSN6 in FIG. 8 represent solutions of a micro cell type, the base stations BSN1 and BSN2 located "higher" on the network can be of macro cell type. If the capacity of the base station nodes BSN1 and BSN2 is not adequate for implementing cross-connection, they can be replaced by cross-connection nodes having a greater capacity.

As illustrated in FIG. 8 in connection with base station BSN2, one of the connection interfaces offered by transmission board units can be a radio link interface. A fully integrated radio link solution in accordance with the invention has the especially great advantage that the internal unit of the radio link is similar to the transmission board units and can be installed directly into the base station (or the base station node) without separate mechanics. (Traditional radio link terminals typically comprise external and internal units. The internal unit requires its own mechanical solution and cabling to other transmission units or to the base station.) A radio link in accordance with the invention is connected directly to the cross-connection bus and it can communicate, using its entire transmission capacity, with all other transmission board units and the base station. A common bus also offers a seamless network management concept as the radio link equipment is integrated in the base station.

Even though the invention has been described in relation to examples referring to the accompanying figures, it is clear that the invention is not limited to these, but that it can be varied in many ways within the limits of the idea of the invention presented in the accompanying claims. Even though the board units, which are used to form the base station node interface for the transmission network, and the radio interface for the mobile stations usually are different board units than the board units which are used to form interfaces for external equipment, it is possible that the same board unit can have different types of interfaces, for example, both the interface for the transmission network and the interface for external equipment. It should also be noted that when a group of units is mentioned in the claims, the group can comprise only one unit, which may have one or several ports out from the base station node. So the essential aspect is that, in addition to normal transmission network and radio interfaces, the base station units have interfaces through which it is possible to offer telecommunications services via a common transmission network by using a cross-connection internal to the node.

What is claimed is:

1. A base station for a cellular network, the base station being connectable via radio path to mobile stations within the area of a cell formed by the base station and via a transmission network to the means controlling the base station, the base station including:
   an internal bus system comprising several buses;
   a group of board units, each board unit having a connector for connecting the board unit to the internal bus system, the group forming at least a physical interface for the transmission network, a radio interface for the mobile stations and at least one service interface for external devices;
   wherein the board units are connected to each other by means of the internal bus system; and
   the base station is provided with internal cross-connection for switching traffic at least between the at least one service interface for external devices and the transmission network, wherein the cross-connection is implemented as a cross-connection bus among the parallel buses of the internal bus system of the base station and as cross-connection functions in the board units.

2. The base station in accordance with claim 1, wherein an external device is connectable to at least one of the interfaces via a wired connection.

3. The base station in accordance with claim 1, wherein at least one of the interfaces provided by said group of board units is a radio link interface.

4. The base station in accordance with claim 1, wherein the base station is equipped with interfaces conforming to several different standards.

5. The base station in accordance with claim 1, wherein the cross-connection is implemented so that it also connects traffic between two service interfaces in order to offer local telecommunications services from the base station.

6. The base station in accordance with claim 1, wherein the group of board units comprises at least one transmission board unit forming a physical interface for the transmission network and at least one base station board unit comprising radio parts of the base station.

7. The base station in accordance with claim 6, wherein at least one of the transmission board units of the base station is a radio link unit.

8. The base station in accordance with claim 6, wherein each transmission board unit of the base station forms a different interface.

9. The base station in accordance with claim 6, wherein said at least one transmission board unit is connected to the cross-connection bus and said at least one base station board unit is connected to a further bus of the internal bus system.

10. The base station in accordance with claim 6, wherein said at least one transmission board unit and said at least one base station board unit are connected to the cross-connection bus.

11. The base station in accordance with claim 1, wherein the group of board units comprises at least one transmission board unit forming a physical interface for the transmission network and at least two base station board units comprising radio parts of the base station, said at least one transmission board unit and a first board unit of said at least two base station board units being connected to the cross-connection bus and a second board unit of said at least two base station boards unit being connected to a further bus of the internal bus system.

12. A base station for a cellular network, the base station being connectable via radio path to mobile stations within the area of a cell formed by the base station and via a transmission network to the means controlling the base station, the base station comprising:
   an internal bus system comprising several buses;
   a group of board units, each board unit having a connector for connecting the board unit to the internal bus system, the group forming at least a physical interface for the transmission network, a radio interface for the mobile stations and at least one service interface for external devices;
   wherein the board units are connected to each other by means of the internal bus system; and
   the base station is provided with internal cross-connection for switching traffic at least between the at least one service interface for external devices and the transmission network, wherein the cross-connection is implemented as a board unit forming a separate cross-connection unit in the base station and as cross-connection lines between said board unit forming the separate cross-connection unit and other board units of the base station, each line forming a connection to one other board unit.

13. The base station in accordance with claim 12, wherein an external device is connectable to at least one of the interfaces via a wired connection.

14. The base station in accordance with claim 12, wherein at least one of the interfaces provided by said group of board units is a radio link interface.

15. The base station in accordance with claim 12, wherein the base station is equipped with interfaces to several different standards.

16. The base station in accordance with claim 12, wherein the cross-connection is implemented so that it also connects traffic between two service interfaces in order to offer local telecommunications services from the base station.

17. The base station in accordance with claim 12, wherein the group of board units comprises at least one transmission board unit forming a physical interface for the transmission network and at least one base station board unit comprising radio parts of the base station.

18. The base station in accordance with claim 17, wherein at least one of the transmission board units of the base station is a radio link unit.

19. The base station in accordance with claim 12, wherein each transmission board unit of the base station forms a different interface.

* * * * *